United States Patent
Bansemir

(10) Patent No.: US 6,427,945 B1
(45) Date of Patent: Aug. 6, 2002

(54) SUBFLOOR STRUCTURE OF AN AIRCRAFT AIRFRAME

(75) Inventor: Horst Bansemir, Munich (DE)

(73) Assignee: Eurocopter Deutschland GmbH, Donauwoerth (DE)

( * ) Notice: Subject to any disclaimer, the term of this patent is extended or adjusted under 35 U.S.C. 154(b) by 0 days.

(21) Appl. No.: 09/570,355

(22) Filed: May 12, 2000

(30) Foreign Application Priority Data

May 14, 1999 (DE) .......................................... 199 22 295

(51) Int. Cl.[7] ................................................. B64C 1/00
(52) U.S. Cl. ..................................... 244/129.1; 244/119
(58) Field of Search ........................... 244/129.1, 118.1, 244/132, 119; 52/79.3, 403.1, 480; 248/346.4

(56) References Cited

U.S. PATENT DOCUMENTS

| | | | |
|---|---|---|---|
| 3,638,992 A | | 2/1972 | Forshee |
| 3,976,269 A | * | 8/1976 | Gupta ........................ 244/119 |
| 4,292,375 A | * | 9/1981 | Ko .............................. 428/593 |
| 4,593,870 A | | 6/1986 | Cronkhite et al. |
| 4,916,027 A | * | 4/1990 | DelMundo .................. 428/586 |
| 4,946,721 A | * | 8/1990 | Kindervater et al. ....... 428/36.1 |
| 5,024,399 A | * | 6/1991 | Barquet et al. ............. 244/119 |
| 5,242,523 A | * | 9/1993 | Willden et al. ............. 156/285 |
| 5,542,626 A | | 8/1996 | Beuck et al. |
| 6,114,012 A | * | 9/2000 | Amaoka et al. ............ 428/182 |

FOREIGN PATENT DOCUMENTS

| | | |
|---|---|---|
| DE | 2059157 | 8/1972 |
| DE | 7233136 | 3/1973 |
| DE | 3744349 | 7/1989 |
| DE | 4313592 | 10/1994 |
| DE | 29702803 | 5/1997 |

OTHER PUBLICATIONS

"Crash Resistant Composite Airframe Structures: Design Concepts and Experimental Evaluation"; by C. M. Kindervater; German Aerospace Research Establishment, Institute of Structures and Design, Stuttgart Germany, Nov., 1996.

* cited by examiner

Primary Examiner—Peter M. Poon
Assistant Examiner—Timothy D. Collins
(74) Attorney, Agent, or Firm—W. F. Fasse; W. G. Fasse

(57) ABSTRACT

A subfloor structure of an aircraft airframe, particularly of a helicopter, includes longitudinal beams and crossbeams that intersect each other and are interconnected to form a grid that is fixedly attached to the floor and the bottom skin of the aircraft fuselage. Structural elements such as pyramid frustums and reinforcements are arranged on the beams. The longitudinal beam and the crossbeam have a trapezoidal cross-section that is preferably open on the wider base side, closed by a spine web along the narrow side, and bounded laterally by inclined leg webs that extend downwardly from the spine web at an angle outwardly relative to each other. The subfloor structure grid effectively absorbs the energy of a crash impact having both axial or vertical as well as non-axial or lateral impact force components.

15 Claims, 5 Drawing Sheets

FIG. 2
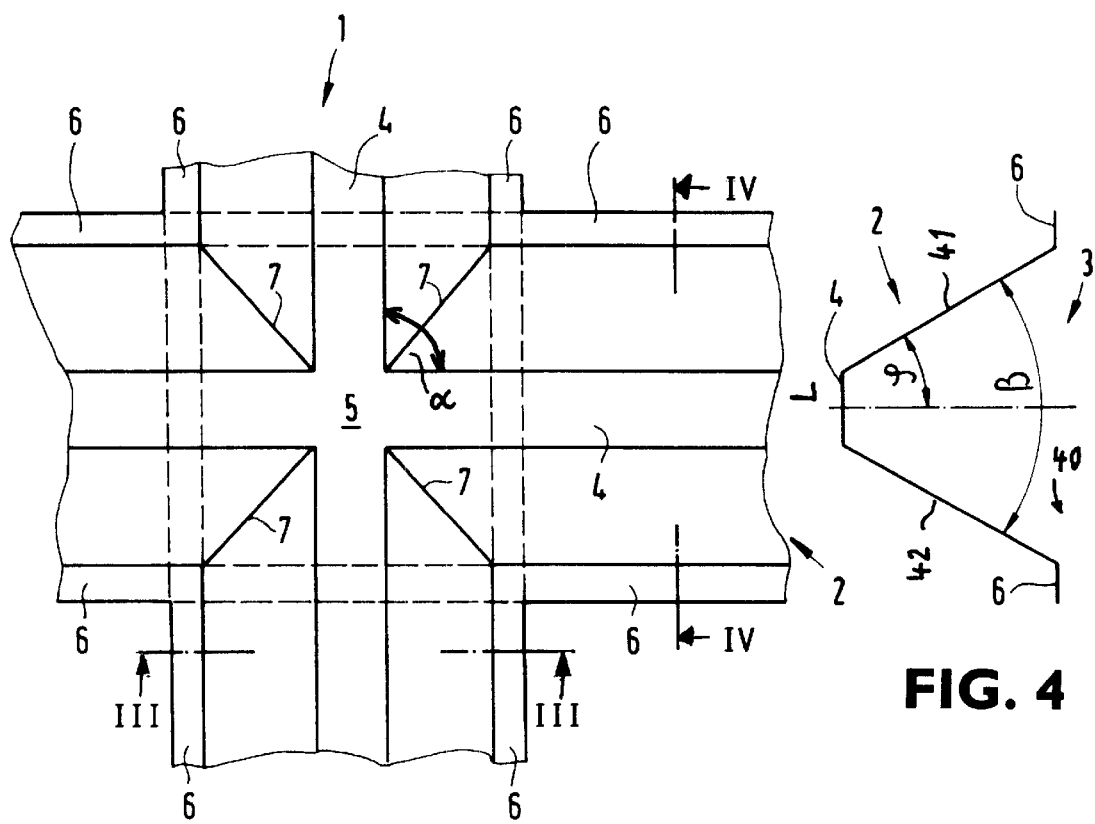
FIG. 4
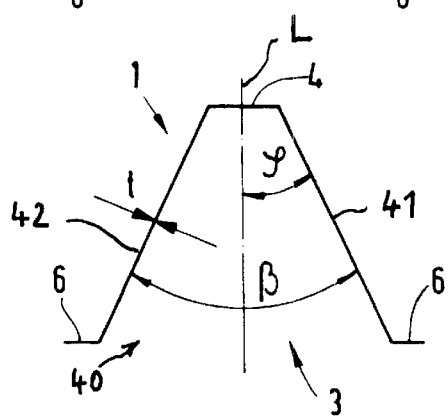
FIG. 3

FIG. 5
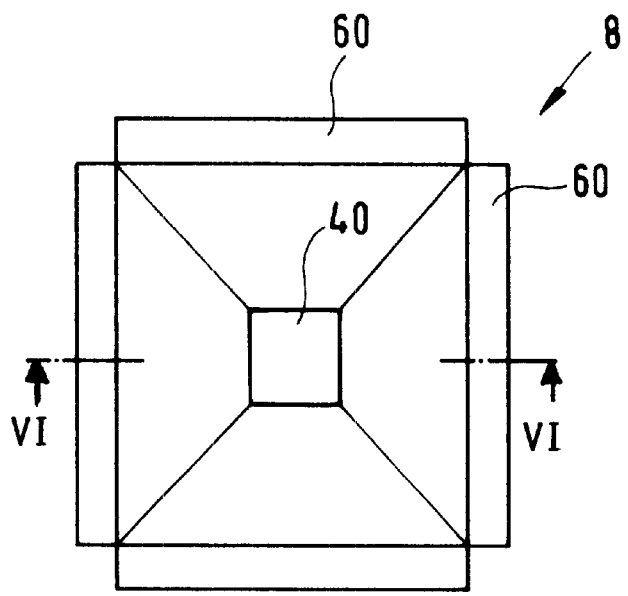
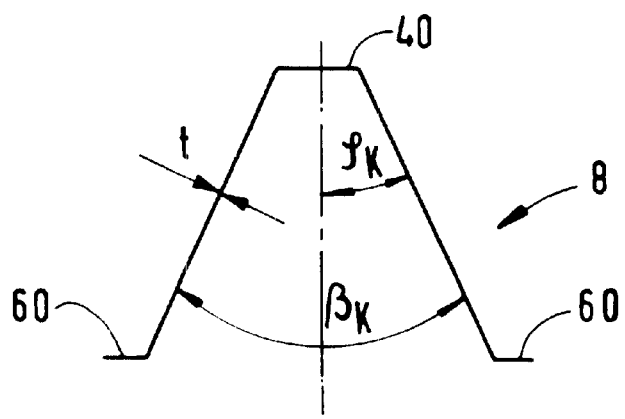
FIG. 6

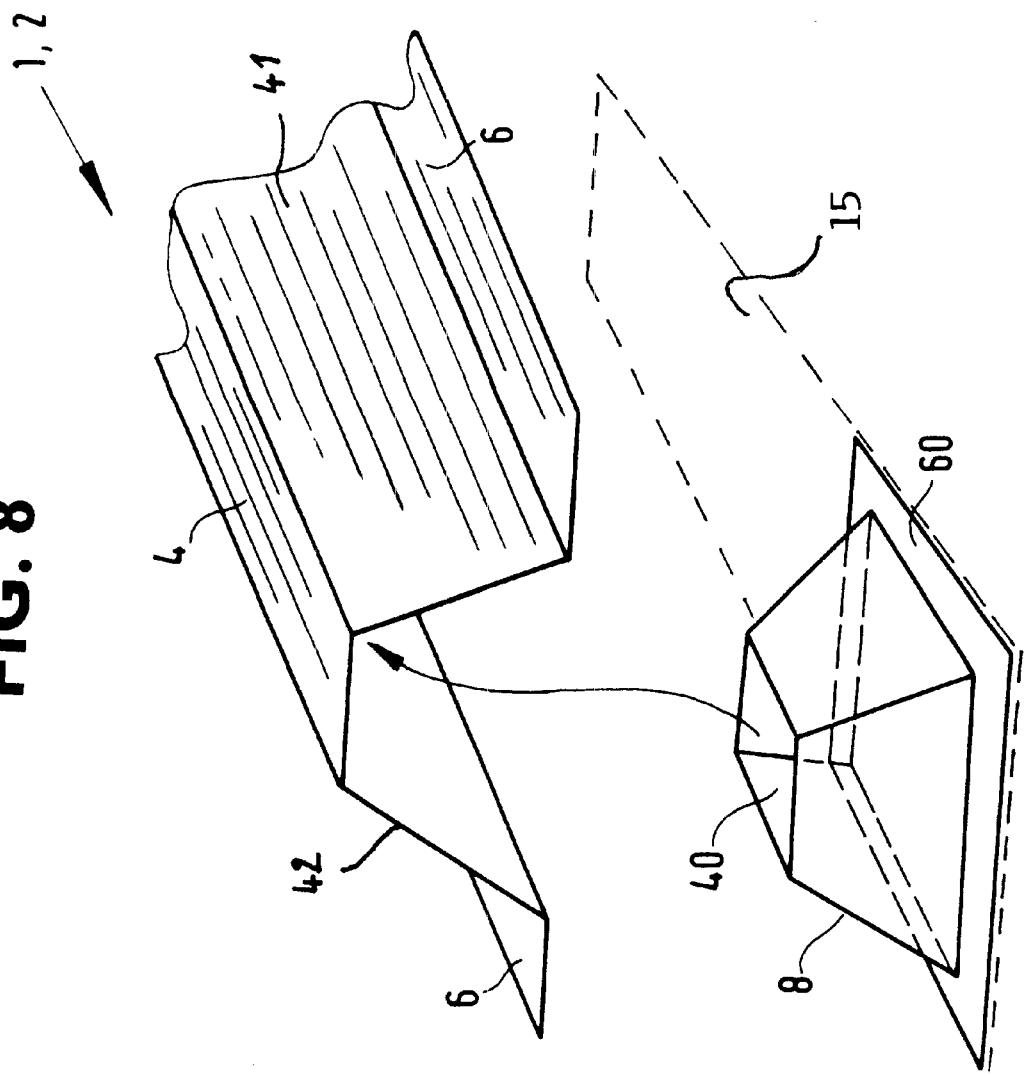

SUBFLOOR STRUCTURE OF AN AIRCRAFT AIRFRAME

PRIORITY CLAIM

This application is based on and claims the priority under 35 U.S.C. §119 of German Patent Application 199 22 295.9, filed on May 14, 1999, the entire disclosure of which is incorporated herein by reference.

FIELD OF THE INVENTION

The invention relates to a subfloor structure of an airframe of an aircraft, particularly the subfloor structure of the fuselage cabin cell of a helicopter. The subfloor structure comprises longitudinal beams and crossbeams that are interconnected with each other and are connected to the floor and the outer bottom skin of the fuselage. Structural elements and reinforcements are inserted in or arranged on the beams.

BACKGROUND INFORMATION

In the aircraft construction industry, significant attention is given to the crash safety design of an airframe to limit damage or injury in the case of a crash or other impact against the lower fuselage. The subfloor structure within the airframe plays an important role in these crash safety designs. The subfloor structure is arranged in the airframe between the floor, which comprises at least a floor panel, and the outer or bottom skin of the fuselage and is attached to the floor and the skin. Structures such as seats are arranged on the floor panels. The purpose of the subfloor structure is to absorb a substantial portion of the kinetic energy of an impact or crash against the lower fuselage section of an airframe, as a means of improving the safety of pilots and passengers.

In aircraft, tanks are often arranged within the subfloor structure. In the case of an impact or crash, the tanks must be able to move, preferably laterally, to avoid rupturing. It is also important that the subfloor structure not rupture or damage the fuel tanks as a result of the impact. The outer skin of the lower fuselage should transmit the crash energy to the subfloor structure, if possible without rupturing the skin, even in a water crash impact for example.

Conventional subfloor structures are constructed under the assumption that the impact against the subfloor structure is represented primarily by an axial load against the substructure, i.e. the crash corresponds to a vertical impact. It is known that a columnar or tubular structural element, for example a cylindrical shell structure of a composite fiber material, provides the best peak force ratio with the highest specific energy absorption in the case of such an impact. For these reasons, tubular structural elements are often used in the construction of subfloor structures. Such tubular elements include forms having a cylindrical cross-section, but also polyhedron forms. These tubular elements are often made of metal or fiber material composites and are integrated into a beam. The subfloor structure then comprises several such beams arranged parallel to each other. Since these tubular or cylindrical elements are very sensitive to a non-axial loading, they are typically provided with so-called triggers that constitute defined specified failure points. These triggers reduce the peak forces that occur during an impact and enable a predictable, controlled failure mechanism, i.e. a controlled direction of failure. This controlled failure mechanism enables prediction of how and when the element will deform under the effects of the load. In a subfloor structure, the crash behavior of the structure is primarily determined by its energy absorption capability and the controlled failure mechanisms of the structural elements.

German Patent Laying-Open Publication DE 37 44 349 A1, FIG. 7, shows and describes the floor of a helicopter in which sinusoidal wave shaped, plate-like structural elements are arranged. The ends of the structural elements are fixed in a frame so that they cannot deflect away from a vertically applied force. If cylindrical shaped composite elements were to be used in such a frame, then a sandwich construction with additional cover plates and additional positioning and connecting elements would be required to contain and secure the structural elements. This is not very practical for several reasons. Fixing the structural elements within a frame increases the complexity and cost of producing the subfloor structure and furthermore leads to a significant increase in weight. It is, of course, a goal in aircraft construction to have a subfloor structure that is a lightweight construction.

The published article by C. M. Kindervater of the German Aerospace Research Establishment of Stuttgart Germany, entitled "Crash Resistant Composite Airframe Structures: Design Concepts and Experimental Evaluation", which was presented November 1996 at the DGLR Conference "Faserverbundwerkstoffe und -bauweisen in der Luft- und Raumfahrt" in Ottobrunn Germany, discloses a subfloor structure constructed of ribs, of which the ends are formed as fiber composite elements in a Y-shape. The ribs are arranged as a cruciform, whereby two Y-shaped ends of two adjoining ribs come together at a respective intersection point and form a respective column-like tetrahedron. These straight column-like tetrahedrons serve as structural elements for absorbing crash energy.

The subfloor structure according to Kindervater provides an improvement over the subfloor structure disclosed in DE 37 44 349 A1, in that additional positioning and retainer elements are not required for the structural elements. The ribs themselves are provided with reinforcements. The subfloor structure according to Kindervater does have the disadvantage, however, that the energy absorbing structural elements are formed only at the intersection points of the cruciform structure. Thus, the use of energy absorbing structural elements is severely limited. Moreover, such column-like structural elements, whether cylindrical or formed as polyhedrons, are sensitive to lateral loads.

The majority of crash events, however, result not only in axial loads, but also in lateral loads. For example, a typical crash of an aircraft is not a strictly vertical impact, but rather involves substantial forward or lateral impact forces as well. The conventional solutions do not give adequate attention to these lateral loads. As a result, the energy-absorbing structural elements that are known and used in aircraft subfloor structures are ineffective for absorbing and dissipating the shock or impact of lateral loads.

SUMMARY OF THE INVENTION

In view of the above it is an aim of the invention to provide a subfloor structure arranged in a fuselage substructure or an airframe and that improves the crash behavior of aircraft. It is a further aim to construct such a structure as a lightweight construction that, in the event of a crash, can absorb energy from non-axial loads, as well as from axial loads, and that will not damage fuel tanks arranged between the floor and the bottom skin of the fuselage. The invention further aims to avoid or overcome the disadvantages of the prior art and to achieve additional advantages, as are apparent from the present specification.

The above objects have been achieved according to the invention in a subfloor structure comprising interconnected longitudinal beams and crossbeams that each respectively have a trapezoidal cross-section. The upper or narrow edge of the trapezoid is formed by a back or a spine, from which depend two leg flanges of the trapezoid. The leg flanges extend downwardly outwardly from each other to form a broad lower base plane of the trapezoid that is opposite and parallel to the narrow spine. The broad base is open, i.e., the trapezoidal beams are hollow and the hollow space is open to the bottom. A flap of material extends along the lower edge of each leg flange outwardly away from the trapezoidal contour of the beam on a plane that is common with the base plane of the trapezoidal beam.

The longitudinal beams and crossbeams intersect and are interconnected with each other at respective intersection areas to form a gridiron or mesh or grate arrangement. Because of the trapezoidal shape of the intersecting beams, each intersection area is shaped as a truncated four-sided cone or pyramid frustum. The leg flanges of the trapezoidal beams are preferably provided with an optimal flank angle of 10° to 25° relative to vertical, depending on the direction of load and type of loading that is to be handled in a crash impact. The diagonally outwardly extending leg flanges of the trapezoidal beams are reinforced. The strength of the beams can also be adapted to the particular application by using a conventional sandwich construction technique with a series of layers as needed to achieve the wall thickness appropriate for the particular application.

Structural elements can be inserted between the leg flanges of the longitudinal beams and crossbeams, at various locations of the beams. The structural elements according to the invention are each preferably formed as an oblong rectangular truncated cone or pyramid (frustum) that fits inside the beams of the subfloor structure and forms a positive fit with the inner contour of the beams formed by the spine and the trapezoidal leg flanges. The subfloor structure preferably comprises a grid of interconnected trapezoidal beams, and a plurality of rectangular cone-shaped or pyramid-shaped structural elements inserted between the leg flanges of the trapezoidal beams at particular locations or substantially along the entirety of the beams. Preferably, a respective flap of material is provided at the base of each of the four walls of the a pyramid-shaped structural element, similarly to the flap provided at the base of each trapezoidal leg flange of the beams. When the structural element is inserted into a beam, the flap from a leg flange will overlap with the flap of a wall of the element. The structural element can be adhesively affixed to the beam simply by applying adhesive to these overlapping flaps. Other types of connection between the structural elements and the beams are also possible, e.g. by riveting or providing interlocking folds or tabs.

The frustum-shaped structural elements are preferably provided with a flank angle that corresponds to the flank angle of the trapezoidal leg flanges of the beams, i.e., an angle between 10° and 25° relative to the vertical, so that these elements fit in a form-fitting manner into the inner contour of each beam. After the cone-shaped or pyramid-shaped elements have been inserted into a beam, the open base side of the beam can then be covered with a plate, for example, that is fixed in place.

The optimal subfloor structure is embodied as an interconnected grid of longitudinal beams and crossbeams with rectangular cones or pyramids inserted between the leg flanges of the trapezoidally shaped beams. The subfloor structure according to the invention provides the advantage that both axial and non-axial or lateral loads can be absorbed during an impact. The trigger devices of conventional subfloor structures are not necessary. The direction of failure of the subfloor structure according to the invention is toward the inner space of the trapezoidal cross-section. This provides additional improvement in the safety behavior of an aircraft because the failed material will move toward this inner space and the likelihood of the failed material damaging or rupturing the fuel tanks that are embedded in the subfloor structure is greatly reduced or eliminated.

The subfloor structure according to the invention is a lightweight structure that provides excellent energy absorption capability. As a result, the structure satisfies industry demands for a lightweight construction. Furthermore, all forces not caused by an impact can be safely transmitted through the subfloor grid structure according to the invention.

BRIEF DESCRIPTION OF THE DRAWINGS

In order that the invention may be clearly understood, it will now be described in connection with example embodiments, with reference to the accompanying drawings, wherein:

FIG. 2 is a plan view of an intersection area between a longitudinal beam and a crossbeam;

FIG. 3 shows the elevational cross-section of a longitudinal beam along the section line III—III in FIG. 2;

FIG. 4 shows the elevational cross-section of a crossbeam along the section line IV—IV in FIG. 2;

FIG. 5 is a plan view of a structural element that is a truncated pyramid or frustum;

FIG. 6 shows the elevational cross-section of the structural element of FIG. 5 along the section line VI—VI;

FIG. 8 is a perspective view showing a structural element in the shape of a truncated pyramid or frustum that is to be inserted into a trapezoidal beam.

DETAILED DESCRIPTION OF PREFERRED EXAMPLE EMBODIMENTS AND OF THE BEST MODE OF THE INVENTION

The fuselage of an aircraft comprises an airframe including at least one fuselage cell such as a cabin cell. Typically, airframes are constructed as modular cell units and, if several such cell units are required, they are simply connected modularly one behind another. The skeleton of an airframe is surrounded and covered by an outer skin, generally by shell segments. The airframe is embodied to accommodate payloads such as flight personnel, passengers, freight, etc. The airframe also supports the necessary floors for supporting the payload. A subfloor structure is connected directly to the floor. This subfloor structure improves not only the bearing capacity of the floor, but also the stability and the crash behavior in the case of an impact of the fuselage dropping from a low altitude. The primary characteristics of a subfloor structure that determine the crash safety behavior of the structure during impact are its ability to effectively absorb portions of the kinetic crash energy and to reliably and predictably fail in a predefined direction of failure.

A subfloor structure according to the invention generally comprises a grid arrangement of longitudinal beams and crossbeams that perpendicularly intersect and are connected with each other, wherein each one of the beams is hollow and has a trapezoidal cross-sectional shape. In one embodiment, each beam is a closed, four-sided box beam, whereby four webs making up the box beam respectively form four sides of a trapezoid. In a second embodiment, the larger base side of the trapezoid is open, i.e. each beam is not a closed box beam but rather a three-sided open beam that does not include a web on the wider base side. This second embodiment is particularly economical, efficient and simple to fabricate, and will now be described in detail.

Figure 1:
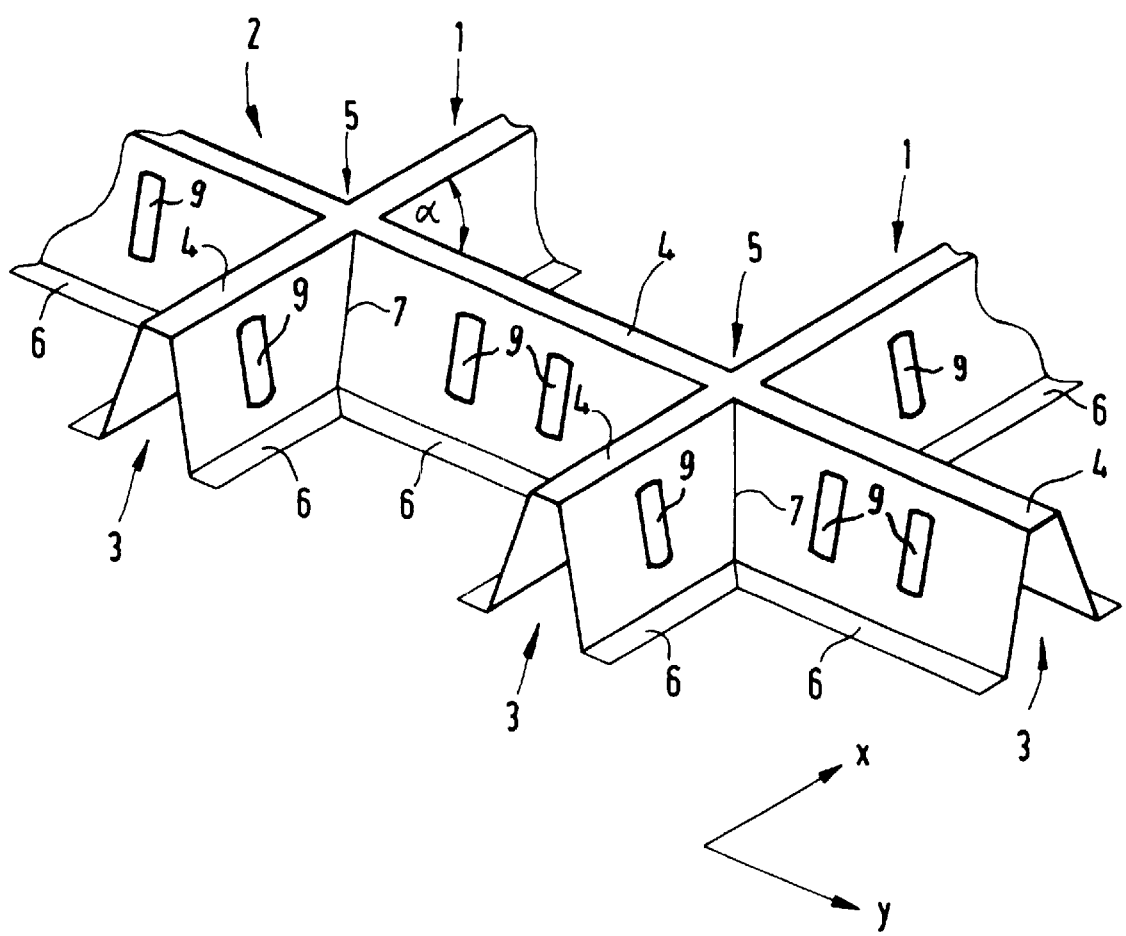
FIG. 1 is a perspective view of a partial subfloor structure according to the invention, showing interconnected longitudinal beams and crossbeams, whereby each of the beams has a trapezoidal cross-section.

FIG. 1 shows a partial view of a particular example of the second embodiment of a subfloor structure according to the invention. Longitudinal beams 1 and crossbeams 2 are interconnected with each other, preferably at right angles to form a rectangular grid. The beams 1, 2 each have a trapezoidal cross-section 3. The upper or narrow edge of the trapezoid is closed by a back or a spine 4. Two leg webs or flanges 41, 42 extend from the spine 4 downwardly and outwardly relative to each other to form two opposite inclined side walls of the trapezoid. As shown in FIG. 1, the walls of the leg flanges 41, 42 are solid, continuous and imperforate. A broad base plane 40 of the trapezoid, i.e. the side of the trapezoid that is parallel and opposite to the spine 4, is open. As shown in FIGS. 3 and 4, the beams 1, 2 are hollow. A beam base flange or flap 6 is provided along the lower base or edge of each leg flange 41, 42. A respective intersection area 5 is formed where each longitudinal beam 1 and crossbeam 2 intersect with each other. Preferably, a plurality of longitudinal beams 1 and crossbeams 2 will be interconnected to form the subfloor structure according to the invention.

The subfloor structure is attached to the floor of an aircraft by the spine (or spines) 4, for example each spine 4 can be adhesively affixed to a lower surface of floor panels. The lower ends of the longitudinal beam 1 and crossbeam 2 are affixed to the outer skin of the airframe. For example, the base beam flap 6 can be adhesively affixed or riveted or otherwise connected to the skin. The leg flanges 41, 42 of the trapezoidal beams 1, 2 can be reinforced with reinforcements 9, shown in FIG. 1. These reinforcements may be corrugations or sinusoidal wave formations of the leg web material, or other types of reinforcements, such as stamped deformations or beads or thickened areas of material regularly spaced along leg flanges 41, 42 of beams 1, 2. It is also possible to reinforce leg flanges 41, 42 by constructing the leg flanges 41, 42 with a sandwich type construction. As shown in FIG. 1, the longitudinal beams 1 and the crossbeams 2 are arranged in a grid and form the intersection areas 5 where the beams 1, 2 intersect with each other. A seam 7 is formed where a longitudinal beam 1 intersects with a crossbeam 2. It is most advantageous if the angle of intersection α between intersecting beams 1 and 2 is substantially equal to 90°. This will provide an even or symmetrical formation of each intersection area 5. Such an embodiment corresponds to an optimal energy absorption and also enables cost effective production. It is less advantageous, but certainly possible, to use an arrangement of the longitudinal beams 1 and crossbeams 2 in a different formation, such as a diamond-shaped grid. The angles of intersection at the intersection areas 5 in such a formation would then, of course, be different.

FIG. 2 shows a plan view of the intersection area 5 that is formed by a 90° intersection of the longitudinal beam 1 and the crossbeam 2. FIGS. 3 and 4 illustrate the sectional views III—III and IV—IV, respectively, of the beams 1, 2. As can be seen in these figures, the trapezoidal base 40 is open, and the beams 1, 2 are hollow. The leg flanges 41, 42 of the trapezoidal beams 1, 2 extend from the spine 4 at a flank angle σ relative to a vertical plane L defined as perpendicular to the plane of the spine 4. The flank angle σ represents the angle of slope of the angled trapezoidal leg flanges 41, 42 of the trapezoidal beams 1, 2, relative to the vertical plane L. For practical reasons, the respective flank angles σ of both leg webs 41 and 42 are equal, and are also the same for both the longitudinal beam 1 and the crossbeam 2. A trapezoid angle β describes the angle with which the two angled leg flanges 41, 42 enclose the trapezoidal cross-section 3. The trapezoid angle β is a sum of the two flank angles σ, i.e. β=2σ when both flank angles are the same.

The beams 1, 2 are dimensioned by geometric measurements of the three sides of the trapezoids, i.e. the spine 4 and the leg flanges 41, 42, the flank angle σ, a wall thickness t, and the material. Preferably, fiber composite material is used for the subfloor structure. Other materials may also be used, depending on the particular application. Using fiber composite material, the walls of the longitudinal and crossbeams 1, 2 can be advantageously constructed with a sandwich type construction. The flank angles σ of the longitudinal and crossbeams 1, 2 can also be adapted to the particular application, whereby the beams 1 and 2 may have the same or different flank angles.

Providing the longitudinal beams 1 and crossbeams 2 with the trapezoidal cross-section 3 has the advantage that the subfloor structure can optimally absorb both axial loads as well as non-axial or lateral. loads resulting from an impact or crash. It is not necessary to provide additional trigger devices.

The crash behavior of the subfloor structure in a crash situation can be further improved by providing structural elements in the form of a truncated rectangular cone or pyramid, i.e. a frustum 8 arranged in the beams 1, 2. FIG. 5 shows a plan view of the truncated pyramid 8. FIG. 6 is a sectional view showing the elevational cross-section of the truncated pyramid 8 along section line VI—VI. The truncated pyramid 8 can be inserted in the subfloor structure between two leg flanges 41, 42 of the beams 1, 2, as shown in FIG. 8. Two opposite side walls of the pyramid 8 form a positive fit contact with the inclined leg flanges 41, 42 of the beam 1, 2, and the upper surface 40 of the truncated pyramid 8 is in contact with the inner side of the spine 4 of the beam 1, 2. The opening angle $\beta_K$ of the truncated pyramid 8 should preferably substantially correspond to the opening angle β of the beam 1, 2. The outer contour of the truncated pyramid 8 thus fits the inner contour of the beam 1, 2. A flap 60 is provided along the lower edges of the truncated pyramid 8, as shown in FIG. 5. This flap 60 makes contact and overlaps with the beam base flap 6 of the beam 1, 2, thereby providing an easy means for adhesively affixing the structural element, i.e. the truncated pyramid 8, to the beam 1, 2. Other types of connection are also possible. The truncated pyramid 8 is most preferably embodied as a hollow rectangular cone or frustum, of which the larger of the two parallel surfaces, i.e. the base, is open. The advantage of the structural element in the shape of the truncated pyramid 8 shown in FIGS. 5 and 6 is that it is not sensitive to deviations from the axial direction of loading. The structural elements 8 can be fabricated of metal, e.g. by stamping or drawing, or of fiber composite material, e.g. by molding, spray-up or lay-up.

By inserting the truncated pyramid 8 into the longitudinal beam 1 and/or the crossbeam 2, the capability of energy absorption of the subfloor structure according to the invention is significantly increased. The dimensions of the structural elements 8, and their distribution over the length of the beam 1, 2 are not limited. In contrast to other types of subfloor structures, the truncated pyramid 8 can be inserted into the subfloor structure embodied according to the invention without additional positioning and retaining elements. The beams 1, 2 with the trapezoidal cross-sections 3 and the inserted truncated pyramids 8 according to the invention provide a very effective solution to the problem of providing increased energy absorption behavior with a lightweight construction and a predefined direction of failure under both axial as well as lateral loads.

Figure 7:
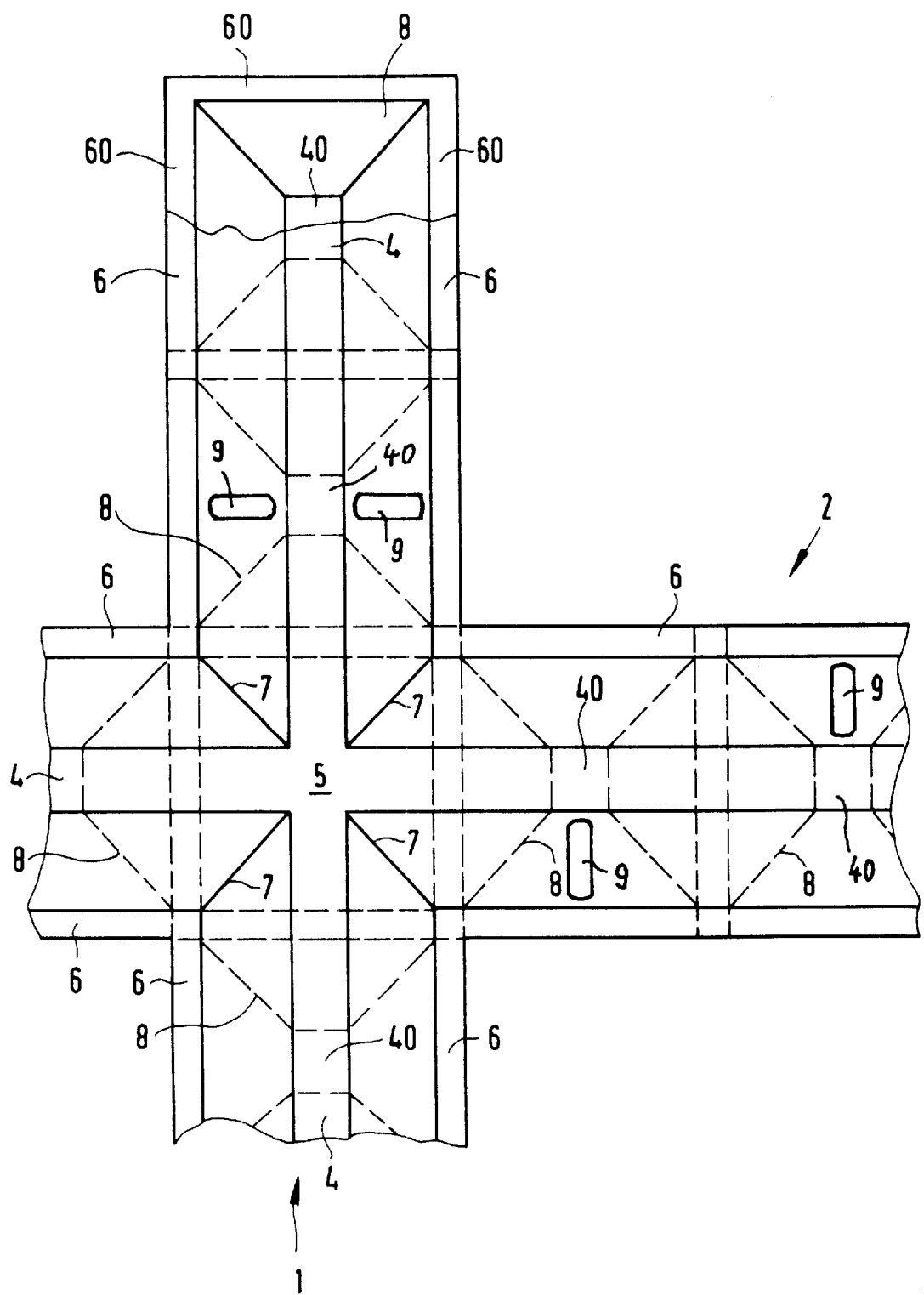
FIG. 7 is a plan view of a partial subfloor structure, showing an arrangement of inserted structural elements with dashed lines.

FIG. 7 is a plan view of the longitudinal beam 1 and the crossbeam 2 with inserted truncated pyramids 8 shown with dashed lines. The number and arrangement of truncated pyramids 8 to be inserted can be adapted to the particular application. An advantageously high capability of absorbing kinetic energy is achieved if one truncated pyramid 8 is arranged directly next to another one. Since the intersection area 5 between the longitudinal beam 1 and the crossbeam 2 also corresponds substantially to the rectangular cone structure of the structural elements, it is not necessary to insert an additional pyramid 8 in the intersection area 5.

In the preferred embodiment, the subfloor structure is embodied in a grid-like arrangement of the trapezoidal longitudinal beams 1 and crossbeams 2. Reinforcements 9 are arranged on the trapezoidal leg flanges 41, 42 of the beams 1, 2. Alternatively, the leg flanges 41, 42 can be embodied as a sandwich construction. The spine 4 of each beam, which corresponds to the narrower one of the two parallel sides of the trapezoidal cross-section 3, is affixed to the floor, and the edges of the broad base plane of the subfloor structure that come into contact with the outer skin are affixed to that skin. Alternatively, a base plate 15, shown schematically in FIG. 8, can be affixed to the underside of the pyramid base flaps 60 of one or more truncated pyramids 8 and/or of the beam base flaps 6. When the subfloor structure is assembled in an aircraft as described above, the direction of failure is predetermined toward the inner area or interior space in the trapezoid and/or toward the inner area of the truncated cone or pyramid 8. This ensures that the subfloor structure material will not damage the fuel tanks that are arranged between the beams of the subfloor structure. Because the subfloor structure is capable of absorbing energy from both axial and non-axial directions, not only can it dissipate crash energy effectively, but it can also effectively transmit through the grid all forces that are not caused by an impact or crash. The subfloor structure possesses excellent energy absorption capability while at the same time being lightweight. Thus, the subfloor structure satisfies the demands with respect to stringent weight requirements.

FIG. 8 shows a short partial section of the beam 1, 2 into which a truncated cone or pyramid 8 is to be inserted. When inserted, the upper side 40 of the truncated pyramid 8 is in contact with this underside of the spine 4 of the beam 1, 2. The upper side 40 is rectangular in shape. As can be seen from FIGS. 3, 4, and 6, the trapezoidal profile of the truncated pyramid 8 corresponds substantially to the trapezoidal cross-section 3 of the beams 1, 2. The beam base flap 6 provided along the lower edge of the trapezoidal leg flanges 41, 42, lies along a plane that is common with the base plane 40 of the trapezoid and extends away from the hollow trapezoidal cross-section 3. When the truncated pyramid 8 is inserted into the beam 1, 2, it forms a positive fit with the inner contour of the beam 1, 2, and at least one of the flaps 60 that run along the base sides of the truncated pyramid 8 overlaps with the respective beam base flap 6 on the beam 1, 2. The overlapping flaps 60, 6 can be adhesively affixed to each other.

Additional neighboring truncated pyramids 8 can be inserted successively along the length of each of the beams 1, 2. In this manner neighboring truncated pyramids 8 can be connected to each other by means of their respective overlapping flaps 60.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An aircraft floor construction comprising a subfloor structure, a fuselage floor supported and secured on a top of said subfloor structure, and a fuselage outer skin secured on a bottom of said subfloor structure, wherein said subfloor structure comprises a plurality of beams including longitudinal beams and crossbeams that are connected to each other, wherein said longitudinal beams intersect and are interconnected with said crossbeams only at respective intersection areas so as to form a grid of said beams with open areas between neighboring ones of said longitudinal beams and neighboring ones of said crossbeams, wherein each one of said beams consists of a respective fiber reinforced composite material, and comprises an upper spine web and two leg flanges extending downwardly from said upper spine web and outwardly non-parallel relative to each other so that each one of said beams has a trapezoidal cross-section that is bounded by said upper spine web and said two leg flanges and that has an open base plane which is opposite, parallel to and wider than said upper spine web, wherein said leg flanges respectively include flange walls and strengthening reinforcements provided thereon, wherein said strengthening reinforcements are selected from the group consisting of corrugations, stamped deformations and stiffening beads on said flange walls of said leg flanges, and wherein said flange walls of said leg flanges are solid, continuous, imperforate walls of said respective fiber reinforced composite material.

2. The aircraft floor construction according to claim 1, further comprising a plurality of independent and individual strengthening structural elements that are respectively inserted between said leg flanges of at least a respective one of said beans at a location away from said intersection areas.

3. The aircraft floor construction according to claim 2, wherein each one of said structural elements is configured as an independent truncated pyramid frustum.

4. The aircraft floor construction according to claim 3, wherein each one of said structural elements is hollow, and has a relatively narrow upper surface, a relatively broad frustum base plane, and frustum walls that slope from said upper surface outwardly and downwardly to said frustum base plane, and wherein said frustum base plane is open.

5. The aircraft floor construction according to claim 4, wherein at least one of said structural elements further comprises a frustum base flap that extends outwardly from a lower edge of at least one of said frustum walls, along said frustum base plane.

6. The aircraft floor construction according to claim 5, wherein at least one of said beams has a beam base flap that extends outwardly along respective lower edges of said leg flanges along said open base plane, and wherein said frustum base flap and said beam base flap overlap and are secured to each other.

7. The aircraft floor construction according to claim 3, wherein a horizontal cross-section of said truncated pyramid frustum is an oblong rectangle.

8. The aircraft floor construction according to claim 3, wherein said truncated pyramid frustum has a top surface and sloping side walls that extend downwardly and outwardly from said top surface at frustum flank angles in a range from 10° to 25° relative to a plane perpendicular to said top surface.

9. The aircraft floor construction according to claim 8, wherein said side walls extend surfacially in contact with and parallel to said leg flanges of said beam.

10. The aircraft floor construction according to claim 1, further comprising a plate arranged to cover said open base plane of at least one of said beams.

11. The aircraft floor construction according to claim 10, wherein said one of said beams further comprises base flaps extending outwardly along said base plane from lower edges of said leg flanges, and wherein said base plate is secured to said base flaps.

12. The aircraft floor construction according to claim 1, wherein said leg flanges extend outwardly from said spine web at a beam flank angle in a range between 10° and 25° relative to a plane perpendicular to said spine web.

13. The aircraft floor construction according to claim 1, further comprising a plurality of pyramid frustum shaped strengthening elements arranged and secured in said trapezoidal cross-section between said leg flanges, such that said strengthening elements are arranged directly next to one another entirely along a length of said beam except at said intersection areas.

14. The aircraft floor construction according to claim 2, wherein said strengthening structural elements each respectively consist of a fiber reinforced composite material.

15. The aircraft floor construction according to claim 2, wherein said strengthening structural elements each respectively consist of a metal.

\* \* \* \* \*

UNITED STATES PATENT AND TRADEMARK OFFICE
CERTIFICATE OF CORRECTION

PATENT NO. : 6,427,945 B1
DATED : August 6, 2002
INVENTOR(S) : Bansemir

It is certified that error appears in the above-identified patent and that said Letters Patent is hereby corrected as shown below:

Column 6,
Line 5, after "angle", replace "σ" by -- φ --;
Line 6, after "angle", replace "σ" by -- φ --;
Line 10, after "angles", replace "σ" by -- φ --;
Line 15, after "angles", replace "σ" by -- φ --;
Line 15, after "i.e.", replace "β=2σ" by -- β=2φ --;
Line 18, after "angle", replace "σ" by -- φ --;
Line 24, after "angles", replace "σ" by -- φ --;

Column 8,
Line 53, before "at", replace "beans" by -- beams --.

Signed and Sealed this

Fifteenth Day of October, 2002

*Attest:*

JAMES E. ROGAN
*Director of the United States Patent and Trademark Office*

*Attesting Officer*